United States Patent [19]
Kramer et al.

[11] 3,818,858
[45] June 25, 1974

[54] DATABLE FOOD STORAGE CONTAINER

[76] Inventors: Howard J. Kramer, 1528 E. 24th St., Brooklyn, N.Y. 11210; Ira Klein, 4126 Bedford Ave., Brooklyn, N.Y. 11229

[22] Filed: Feb. 28, 1972

[21] Appl. No.: 229,654

[52] U.S. Cl. .................. 116/133, 116/121, 206/42, 215/41
[51] Int. Cl. ............................................. G09f 9/00
[58] Field of Search ........ 116/121, 130, 133; 40/61, 40/61 A, 21 B, 310, 306, 312, 313, 307; 206/42; 215/7, 8, 9, 1 C, 41; 99/269, 100; D9/162, 169, 267, 268; 220/60 R

[56] References Cited
UNITED STATES PATENTS

| | | | |
|---|---|---|---|
| 153,529 | 7/1874 | Bennett | 215/7 |
| 169,992 | 11/1875 | Hawkins | 116/121 |
| 261,131 | 7/1882 | Bonshire | 116/121 |
| 596,646 | 1/1898 | Altshul | 116/121 X |
| 2,076,549 | 4/1937 | Conner | 215/1 C |
| 2,201,524 | 5/1940 | Esty | 40/307 |

Primary Examiner—Louis J. Capozi

[57] ABSTRACT

A food storage container which in a preferred embodiment includes a lid with a downwardly extending outer flange of annular shape mountable on a vessel having a rounded mouth with substantially upright walls, the outer surface of the annular flange having a series of evenly spaced markers designating each a particular day of the week, and the outer upright wall's outer surface extending annularly around the vessel having a series of time period-interval indicators such as typically and preferably the 31 days of the longest months of the year, with the spaces between the days of the week on the lid flange being of a predetermined dimension such that solely one day of the week mark is alignable with any of the one through thirty-one days of the month on the vessel wall, i.e., at any one time it being impossible for more than one of the respective days of the week being aligned with different ones of the thirty-one days of the month, whereby it is possible always to precisely align a specific day with a specific date without the possibility of confusion insofar as other days being aligned with other dates.

11 Claims, 5 Drawing Figures

PATENTED JUN 25 1974  3,818,858

DATABLE FOOD STORAGE CONTAINER

This invention relates to a food container of the type in which left-over food from a particular meal or other perishable goods might be stored.

BACKGROUND TO THE INVENTION

Prior to the present invention there has not existed any food storage container designed for repeat usage where with simplicity the date on which the foods or perishable material was placed into the container could be accurately recorded for subsequent refreshing of the memory of the housewife when looking into the refrigerator.

SUMMARY OF THE INVENTION

An object of the present invention is precisely to satisfy the above-noted need.

More particularly, an object of the present invention is to obtain a food-storage container utilizable repeatedly, having a time-indicating mechanism for designating the specific time at which storage was begun for a particular perishable quantity of goods stored therein.

Another object is to provide a container of the type indicated in the preceding objects of a construction which does not readily become contaminated or accumulate unsanitary food particles and the like.

Another object is to obtain a food-storage vessel having two separate series of alignable time period interval indicators and marks respectively which are pairable one at a time.

Other objects become apparent from the preceding and following disclosure.

One or more of the preceding objects are obtained by the invention as herein described.

In a broad statement of the invention, the invention includes a food vessel of a circular shape at least at the mouth thereof with a rotatable lid having a downwardly extending flange with an outer face of the flange being substantially parallel with the outer face of the upright walls of the vessel and overlapping the vessel walls, with either a plurality of one or more markers located serially around the flange outer surface and the plurality of indicators serially mounted on the upright vessel wall or alternatively with the one or more markers being mounted on the upright vessel wall outer surface and the indicators being mounted serially along the outer surface of the annular flange.

THE FIGURES

DETAILED DESCRIPTION OF THE INVENTION

Figure 1:
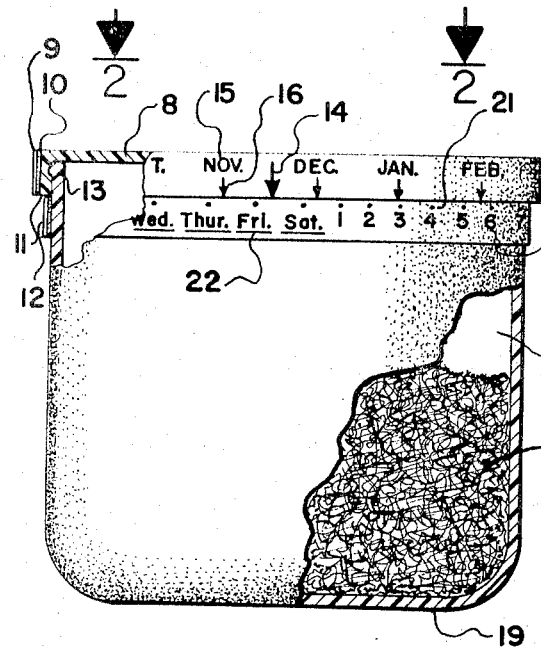
FIG. 1 illustrates a side view of a typical embodiment of the present invention, with cut-away portions in two different sections thereof for purposes of illustrating structure.

FIG. 1 in detail, illustrates a food container 6 designed for repeat usage, including a vessel 7 and a lid 8. The lid includes a strip 9 mounted by an adhesive composition 10 on an outer surface of a flange 11 extending peripherally around and as a part of the lid 8. The inner diameter of the flange 11 is of a predetermined dimension such that the lid is slidable onto and overlappingly over the mouth wall 13 of the vessel 7 preferably in a snug fit. Mounted on the wall 13 is another strip 12 extending peripherally around the mouth of the vessel 7 wall 13 below the flange 11. The flange-mounted strip 9 carries one or more markers 14, and in the present embodiment of FIG. 1, other markers being indicative of specific months of the year such as marker 15, whereas the strip 12 adhesively attached to the wall 13 on an outer face thereof carries indicia such as the days of the week, typically such as indicia 22 which indicates Friday, or indicia 21 which indicates the fourth day of the month. In the particular embodiment illustrated, the matched pair is the 3 of the strip 12 and the January mark of the strip 9 — which means that the food material 18 was placed into the enclosure 17 on January 3. It should be noted that this embodiment also illustrates the preferred spacing of each of the indicia on the tape 12 and the indicia on the tape 9 such that solely the 3 is aligned with the month of January and when the 3 is aligned with the month of January no other number nor no other day of the week is aligned with any other marker of the lid.

Figure 2:
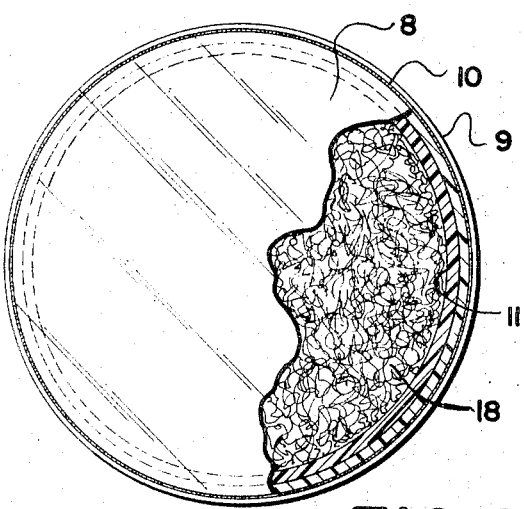
FIG. 2 illustrates a top elevation plan view of the embodiment of FIG. 1 as taken along lines 2—2 of FIG. 1.

FIG. 2 is a top plan view of FIG. 1 along lines 2—2, better illustrating the relationship of the lid 8 having the strip 9 adhered by glue 10 to the outer surface of the flange 11, and the food composition 18 being shown through the cut-away portion of the lid.

Figure 3:
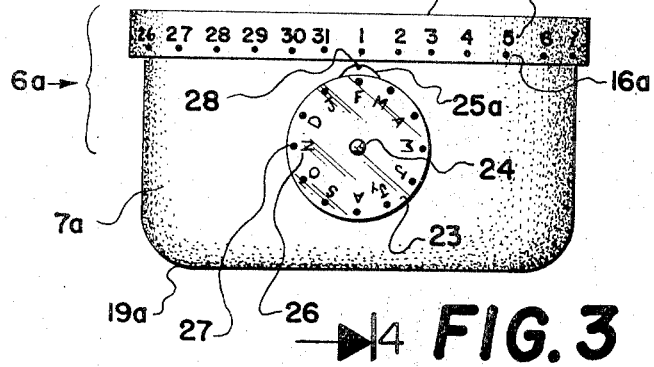
FIG. 3 illustrates an alternative embodiment in side view.

FIG. 3 illustrates another embodiment of the invention, vessel 6a and lid, the vessel 7a having a bottom portion 19a preferably flat, such as bottom 19 of FIG. 1, and the side of the upright walls 7a having mounted thereon a disk 23 on and rotatable around a pivoting shaft 24 with specific points such as 27 having indicia representing the months of the year 26 arranged peripherally around the edge of the circular disk and alignable with a stationary flange 25a having a marker 28 for alignment therewith. Such a disk is capable of having a specific month aligned with a specific point 16a of a particular day 21a of the month located on the flange of the lid 8a.

Figure 4:
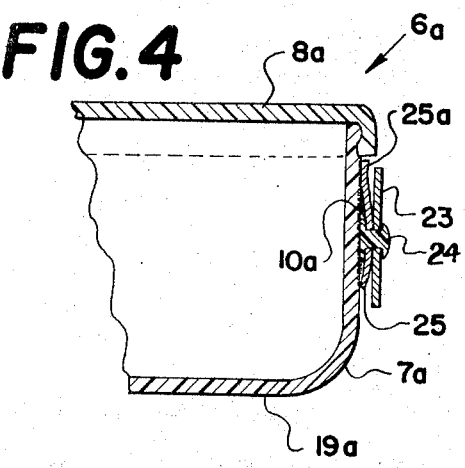
FIG. 4 illustrates an in-part view in cross section of the embodiment of FIG. 3 taken along lines 4—4 of FIG. 3.

FIG. 4 illustrates a view of FIG. 3 shown in-part, as taken along lines 4—4 of FIG. 3. Accordingly, the snap-on arrangement of the flange of the lid 8a onto the upper mouth wall 7a is better illustrated, as well as the flange 25a being a part of the material adhered to the wall 7a thereby mounting the shaft 24 which carries the disk 23, the vessel having its flat bottom 19a.

Figure 5:
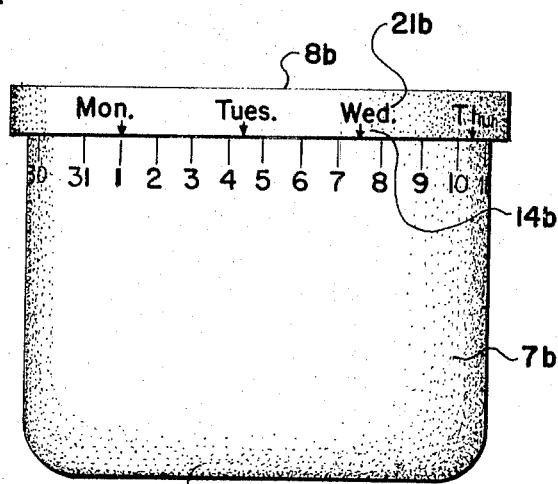
FIG. 5 illustrates an alternative embodiment in side view different from preceding embodiments.

FIG. 5 illustrates a particular preferred embodiment of the invention in which the days of the week are arranged about evenly spaced around the flange of the lid 8b such as Wednesday indicated by 21b for point 14b for alignment solely one at any one particular time with one of the thirty-one days of the month serially arranged around the annular vessel wall 7b, with the spacing being such that for example when the Monday mark is aligned with the number 1, no other day-mark is aligned with any other day of the month number. Thereby, as in the other embodiments illustrated, there can never be any confusion as to which day the material or food was first stored in the container if reasonable care is taken to carefully align the specific day of the week with the specific day of the month at the time of placing of the perishable goods into the container for storage in the refrigerator, for example.

By virtue of the present invention it is more easily possible for the housewife to determine how long a particular quantity of food has been stored, not only serving as a reminder that the food must be utilized soon if spoilage is to be prevented, but also placing the housewife on notice of the fact that particular food possibly is too aged for sanitary consumption or at least for retaining any esthetic qualities.

Note that for example, for the FIG. 5 embodiment in which the numbers and indicator arrows and words are placed directly onto the container and flange surfaces, such imprinting may be by any suitable printing or embossing or raised-surface or depressed surface method of imprinting readable numbers, letters and the like.

It should be understood that the specific embodiments illustrated of this particular invention are not all inclusive but are merely for purposes of more clearly setting forth the invention for understanding, it being within the scope and spirit of the invention to make such modifications and variations as would be apparent to a person of ordinary skill.

We claim:

1. A dating device for indicating on a container the date on which perishable goods are placed in the container comprising in combination: a vessel having a rounded upper mouth-defining structure including a tubular substantially upright wall having rounded outer and inner wall faces, and a circular lid having on its peripheral edge a downwardly extending annular flange having an outer flange face substantially parallel with the rounded outer wall face, on one of (a) said outer wall face and (b) said outer flange face there being an indicia means including a series of consecutive-days indicators and on the other of (a) said outer wall face and (b) said outer flange face there being a marker means matachable with any one of said consecutive-days indicators by movement of said lid in a rotary direction when the lid is mounted on said vessel.

2. The device of claim 1, in which said marker means includes a plurality of indicator marks in series with one another mounted on one of the rounded surfaces.

3. A device of claim 2, in which said series of indicator marks designate a series of second time intervals different from the time period indicators.

4. A device of claim 3, in which said consecutive-days indicators are numbers ranging from one through thirty-one.

5. A device of claim 4, in which said plurality of said indicator marks are designations ranging through the days of the week.

6. A device according to claim 4, in which said indicator marks are marks ranging through the months of the year.

7. A device according to claim 2, including a substantially circular disk and a mounting shaft extending about centrally through the disk allowable of pivotable movement of the disk around the shaft, said shaft being mounted on said vessel outer face, and one of said consecutive-days and said plurality of indicator marks being circularly arranged along a periphery of said disk on said disk outer face.

8. A device according to claim 2, in which spaced intervals between different adjacent ones of said plurality of indicators and spaced intervals between different ones of the plurality of said marks are such that when said lid is mounted flush on said vessel only one mark is alignable with only one indicator at any one position of the lid.

9. A device according to claim 1, in which said marks means and said indicators are indicia placed directly on and in contact with the respective wall outer face and the respective flange outer face.

10. A device according to claim 1, in which the marks means and the indicators each respectively include a mounting surface respectively attachable to the wall outer surface and the flange outer surface.

11. A dating device for indicating on a container the date on which perishable goods are placed in the container comprising in combination: a circular lid having a circumscribing edge and having a downwardly extending annular flange defining joining means for detachably joining the lid sealably onto a container vessel to close the container's mouth; and a movably-mounted member movable relative to the lid's circumscribing edge, the movably mounted member having a member-circumscribing edge of the member which member-circumscribing edge is at least partially rotatably mounted for rotation along the lid's edge substantially in juxtaposition with the lid's edge; and on one of the lid's circumscribing edge and the member-circumscribing edge there being aligned therealong a series of consecutive-days indicators and on the remaining other one of said lid's circumscribing edge and the member's circumscribing edge there being a marker means, such that by moving the movably mounted member in a rotary direction the marker means is matachable with any one or more of said indicators.

* * * * *